United States Patent [19]
Crane

[11] 3,756,332
[45] Sept. 4, 1973

[54] DISC TYPE CENTER CUTTER FOR A BORING MACHINE

[75] Inventor: Clayton H. Crane, Mercer Island, Wash.

[73] Assignee: The Robbins Company, Seattle, Wash.

[22] Filed: Nov. 1, 1971

[21] Appl. No.: 194,217

[52] U.S. Cl................. 175/364, 175/352, 175/358, 175/372, 175/376, 299/86
[51] Int. Cl............................ E21b 9/08, E21b 9/12
[58] Field of Search...................... 175/62, 334, 351, 175/352, 361–366, 371–374, 376, 359; 308/8.2; 299/86

[56] References Cited
UNITED STATES PATENTS

| | | | |
|---|---|---|---|
| 3,232,670 | 2/1966 | Robbins et al......................... | 299/56 |
| 1,826,059 | 10/1931 | Dunn et al........................... | 175/334 |
| 2,201,219 | 5/1940 | Bell.................................. | 175/351 X |
| 2,766,977 | 10/1956 | Robbins............................... | 299/86 |
| 2,949,281 | 8/1960 | Baur et al. .......................... | 175/334 |
| 3,216,513 | 11/1965 | Robbins et al.................. | 175/372 X |
| 3,545,811 | 12/1970 | Montacie........................... | 299/86 X |
| 3,572,452 | 3/1971 | Winberg............................. | 175/371 |
| 3,679,009 | 7/1972 | Goodfellow.......................... | 175/372 |

Primary Examiner—David H. Brown
Attorney—George M. Cole, Delbert J. Barnard et al.

[57] ABSTRACT

A fixed shaft is mounted on the cutterhead to extend across the rotary axis of the cutterhead. A plurality of independently freely rotating disc cutter wheels are mounted on said shaft at different radial spacings from the cutterhead axis. The cutterhead carries additional disc cutters spaced radially outwardly from the center cutter assembly. All disc cutters include circumferential cutting edges which cut concentric kerfs in the rock at the tunnel face and sloping breaker surfaces on opposite sides of the cutting edge for crushing and dislodging the rock between the kerfs. The centermost disc cutter of the center cutter assembly includes a radially inwardly facing breaker surface which crushes and dislodges the material within the kerf cut by said centermost disc cutter.

The disc cutter wheels have parallel radial side faces. The wheels are mounted for rotation by plain bearings or bushings which carry the radial loads. Washer-like plain radial bearings are provided outwardly of each of the side faces to carry the thrust loads. A seal ring presenting a radial face of hard material against the radial side face of the cutter wheel surrounds each thrust bearing. A ring of elastomeric material serves to cushion the seal member and urge it positively into contact with the side face of the cutter wheel.

11 Claims, 5 Drawing Figures

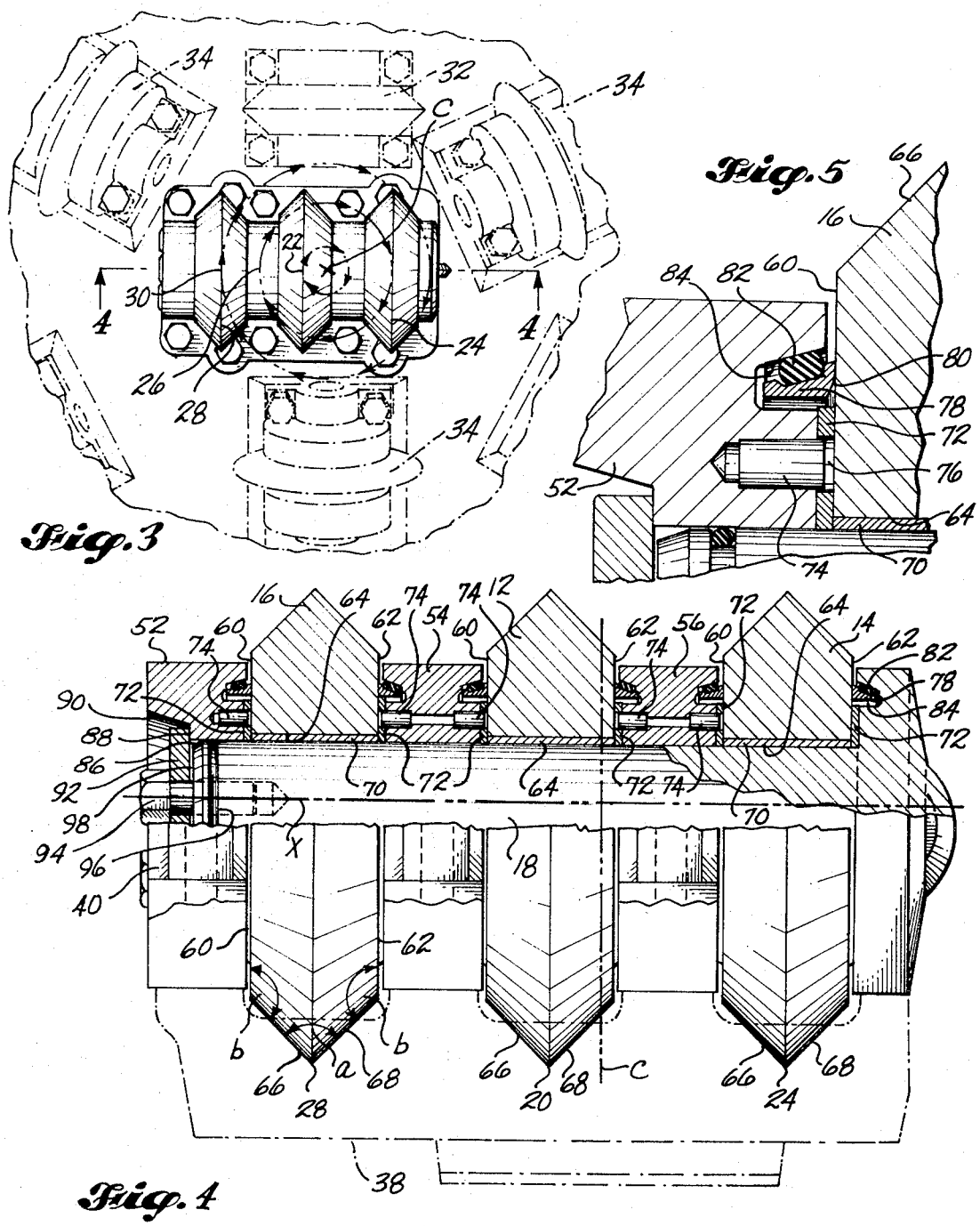

DISC TYPE CENTER CUTTER FOR A BORING MACHINE

BACKGROUND OF THE INVENTION

1. Field of the Invention

The present invention relates to improvements in rock boring machines, and in particular to a new disc cutter assembly for cutting the rock at the center region of the rock face, and to improved bearing and seal assemblies for disc type rock cutters.

2. Description of the Prior Art

U.S. Pat. No. 3,232,670, granted Feb. 1, 1966 to Richard J. Robbins and Douglas F. Winberg discloses a typical cutter arrangement on the cutterhead of a rock boring machine. Such cutterhead includes a plurality of disc cutter assemblies positioned for cutting concentric kerfs in the rock. The disc cutters include sloping breaker surfaces flanking circumferential cutting edges. These breaker surfaces serve to fracture and dislodge the rock material between the kerfs. The center region of the cutterhead carries a tri-cone cutter assembly which serves to grind away the material at the immediate center of the rock face. One problem with this type of an arrangement is that the tri-cone cutter is inefficient unless it is rotated at a speed much faster than the disc cutters can be rotated. When rotated at low speeds the tri-cone cutter assembly wears out fast. Also, the tri-cone cutter assembly is subjected to lateral forces imposed by the breaker surface of the innermost disc cutter wheel. It has been proposed to drive the tri-cone cutter assembly at a higher speed than the rest of the cutterhead, or to replace such tri-cone cutter with a pattern of drag bits. However, neither of these arrangements have been satisfactory, particularly when the rock to be cut is quite hard.

SUMMARY OF THE INVENTION

According to the present invention, the center region of the rock face is cut by a disc cutter. The use of a disc cutter at the center region is made possible by the employment of a support shaft for the cutter wheel which extends laterally across the rotational axis of the cutterhead. The shaft is made long enough to support a plurality (e.g., three) of disc cutter wheels. The next two disc cutter wheels are mounted onto the cutterhead by independent mounting means spaced laterally outwardly from the center cutter assembly on the opposite sides thereof. This arrangement makes it possible to start with a disc cutter wheel positioned to cut a first kerf closely adjacent the rotational center of the cutterhead and then provide additional disc cutter wheels outwardly therefrom which are appropriately spaced apart in the radial direction to provide the necessary minimum distance between kerfs to render the disc cutters effective. The centermost disc cutter wheel includes s sloping breaker surface radially inwardly of its cutting edge which serves to crush and dislodge the material immediately surrounding the rotational axis of the cutterhead.

The necessary close radial spacing of the cutter wheels at the center region of the cutterhead is in part made possible by novel bearing and seal assemblies of this invention. According to the invention, each disc cutter wheel of the center cutter assembly is mounted on a plain or sleeve type bearing or bushing for independent rotation about a common support shaft. Each disc cutter wheel includes a pair of parallel, radial side surfaces and washer like plain thrust bearing which make contact with radial inner portions of the side faces. The mounting means for the cutter wheels comprises an annular cavity or groove concentrically surrounding each thrust bearing. A seal ring is housed in each such groove and is cushioned and urged axially towards its side surface of the cutter wheel by a backup elastomeric ring. The seal member includes a hard radial face which is in sliding engagement with the side face of the cutter wheel. This support bearing and seal arrangement requires a minimum of axial space and makes relatively close spacing of the cutter wheels possible. Also, the mounting of the innermost plurality of cutter wheels on a single support shaft results in shaft support on each side of each disc cutter wheel.

These and other features, advantages and characteristics of the earth boring equipment of the invention will be apparent from the following detailed description of a typical and therefor nonlimitive embodiment of the invention, and from the accompanying illustrations.

BRIEF DESCRIPTION OF THE DRAWING

FIG. 3 is an enlarged scale view of the central region of the cutterhead, showing the center cutter assembly in front elevation and showing a surrounding group of additional roller cutters in reference;

FIG. 4 is a view of the center cutter assembly partially in bottom plan and partially in longitudinal section, taken substantially along line 4—4 of FIG. 3; and FIG. 5 is a fragmentary enlarged scale sectional view in the seal region of one of the disc cutters.

DESCRIPTION OF THE PREFERRED EMBODIMENT

Figure 1:
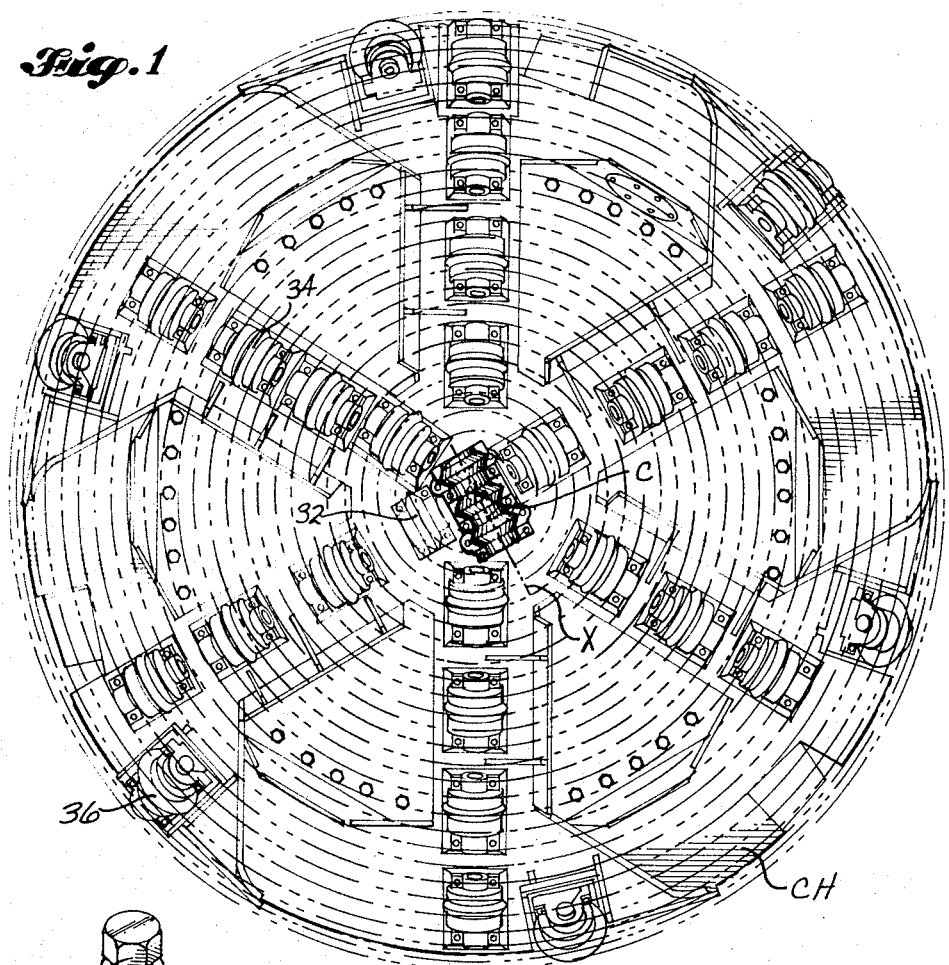
FIG. 1 is a front elevational view of an earth boring machine, showing a typical pattern of concentric circle cutting roller disc cutters on the cutterhead, and showing the center disc cutter assembly of this invention.

Referring to FIG. 1, the center cutter assembly 10 is shown to comprise three roller disc cutters 12, 14, 16 which are supported for independent free rotation on a single elongated support shaft 18 (FIG. 4). The longitudinal axis $x$ of shaft 18 is directed across the longitudinal center line or rotational axis $c$ of the cutterhead CH. Shaft axis $x$ intersects cutterhead rotational axis $c$ at a location which is axially between roller cutter 12 and roller cutter 14, but closer to roller cutter 12 then to roller cutter 14. Owing to this arrangement, the circumferential cutting edge 20 of cutter disc 12 travels a relatively small circle 22. The cutting edge or apex 24 of disc cutter 14 travels a slightly larger diameter circle 26. The cutting edge 28 of disc cutter 16 travels a third and still larger diameter circle 30. The circular paths 22, 26, 30 are concentrically based about the cutterhead axis $c$. A plurality of additional cutter assemblies 32, 34 and 36 are arranged on the cutterhead CH to cut additional concentric circles surrounding the inner cutter edge paths 22, 26, 30.

Figure 2:
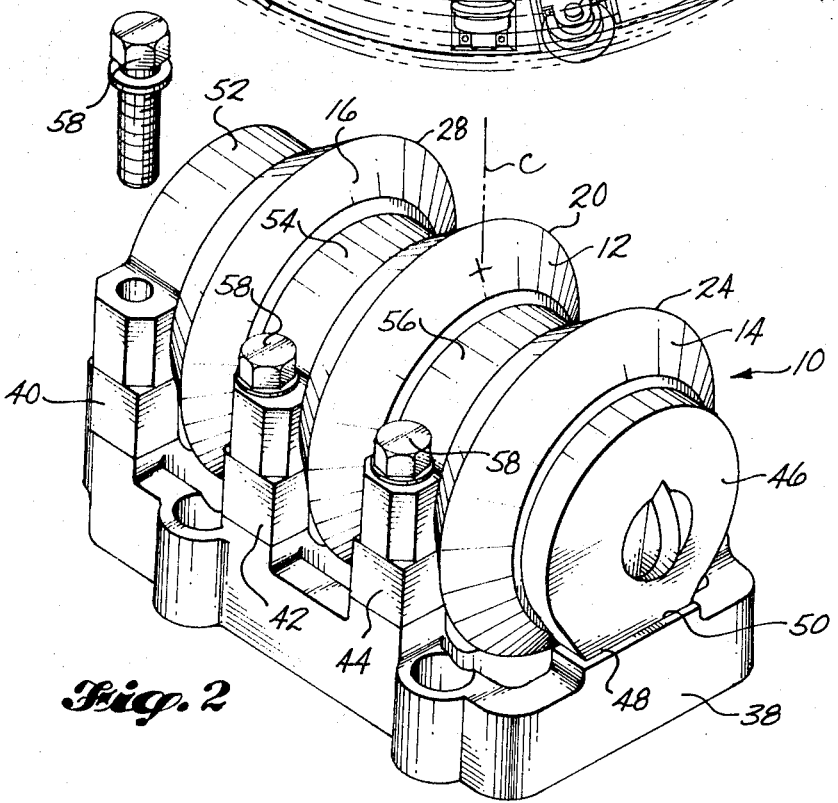
FIG. 2 is an isometric view of the center region disc cutter assembly, taken from above and looking toward one end and one side thereof.

Referring to FIGS. 2 and 4, the center cutter assembly 10 is shown to comprise a mounting block having a base 38 which is bolted or otherwise firmly secured to the cutterhead CH. The mounting block 38 includes means forming a support for common shaft 18 on each side of all three of the cutter discs 12, 14, 16. By way of typical and therefore nonlimitive example, the mounting block may comprise upwardly opening saddles outwardly of disc cutter 16, between disc cutters 12 and 16, and also between disc cutters 12 and 14. These saddles, designated 40, 42 44 in FIG. 2, may be generally similar to the saddles at the opposite ends of the cutter mounting frame 10 shown by FIGS. 1 and 2 of U.S. Pat. No. 3,216,513, granted to Richard J. Robbins and Douglas F. Winberg on Nov. 9, 1965.

In the illustrated embodiment the shaft 18 is provided with an enlarged head portion 46 having a flat lower edge surface 48 which mates against a flat upwardly directed surface provided on the near end portion of base 38. When the opposite end portion of the shaft 18, and the two intermediate portions of the shaft 18 between the cutters 12, 16, and 12, 14 are resting in the saddles 40, 42, 44, the flat head surface 48 is resting on the base surface 50. The saddles 40, 42, 44 are provided with retainer caps 52, 54, 56, respectively, which are secured to the saddles 40, 42, 44 by machine bolts 58 or the like.

Each disc cutter 12, 14, 16 includes a pair of parallel radial side faces 60, 62 and a right cylindrical center opening 64. Each cutting edge or apex 20, 24, 28 is flanked by a pair of sloping breaker surfaces 66, 68. In the illustrated embodiment the angle a between the breaker surfaces 66, 68 is about 90° and the angle b between each surface 66, 68 and the intersecting radial side surfaces 60, 62 is about 135°. Of course, these values are variables and in other installations might be different.

According to the invention, an annular plain or sleeve bearing or bushing 70 supports each cutter disc 12, 14, 16 for independent rotation about the shaft 18. A plain washer or annular disc like thrust bearing 72 is provided on each side of each disc 12, 14, 16. Dowel pins 74, serving as locator pins for the thrust bearings 72, are inset into sockets formed therefor in either the shaft retainer caps 52, 54, 56 or the saddles 40, 42, 44. As best shown by FIG. 5, an axial opening 76 is formed in each thrust bearing 72. Each locator pin 74 includes an outer end portion which projects only partially into the opening 76.

By way of example, the bearings 70, 72 may be made from a molybdenum disulfide impregnated refactory metal composite material, such as a type disclosed in U.S. Pat. No. 3,479,289, granted Nov. 18, 1969, to Jan. W. Van Wyk. Such seals comprise an annular seal ring 78 having a radial seal face 80 which is biased axially into contact with the radial side face 60 or 62 of the cutter wheel 12, 14, 16 by means of an annular ring of an elastomeric material. Seal ring member 78 may be constructed from a suitable metal, ceramic or cermet, or may be of a composite construction (e.g., a ring body of a first material and a seal face of a harder second material).

The seal members 78, 82 are located inside of annular grooves 84 which are formed in the side face of the particular mounting structure facing each cutter side face 60, 62. Referring to FIG. 4, at the right end of the view the groove 84 for the seal members 78, 82 is formed in the inside face of the head member 46. The lower portions of the other grooves 84 are formed in the side faces of the saddles 40, 42, 44 and the upper portions of such grooves 84 are formed in the side faces of the retainer members 52, 54. 56.

The radial bearings 70, the thrust bearings 72, and the saddle and retainer member mounted seal elements 78, 80 are assembled. Then the shaft head mounted seal element 78, 82 are installed and the shaft 18 is inserted through the center of the assembly, including through the bearings 70. An O-ring seal element 86 is located within an annular groove formed in the end of shaft 18 opposite the head 46. This seal ring 86 seals between the shaft 18 and the surrounding passageway formed by the saddle 40 and the retainer member 52.

A radial faced shoulder 88 is formed by portions of the saddle 40 and the retainer member 52. Saddle 40 and retainer member 52 also include an inwardly tapering frusto-conical socket leading into the shoulder 88. A shaft retainer disc or plate 92 is set into the socket 90. One or more machine bolts 94 extend through openings in the plate 92 and thread into internally threaded bores 96 formed in the shaft 18. The length of shaft 18 is such that when the bolts 94 are tightened the end surface 98 of the shaft 18 is located slightly axially inwardly of the shoulder 88. Owing to this arrangement, the bolts 94 can be tightened for the purpose of drawing the head 46 into tight contact with bearing member 72 and retainer disc 92 into tight contact with the shoulder 88.

Although shown in combination with the center cutter assembly 10, the above-described bearing, seal and mounting features are improvements in disc cutter technology which may be used in other disc cutter installations as well.

In operation, the cutterhead CH is rotated by a suitable drive mechanism (not shown). As it rotates, the disc cutters 12, 14, 16 of the center cutter assembly travel along the concentric circular paths 22, 26, 30, and the other cutters 34, 36 travel along other concentric circular paths spaced outwardly from the center cutter assembly 10. The cutting edges of the cutters 12, 14, 16, 34, 36 cut kerfs in the material being mined as they rotate, and the sloping breaker surfaces 66, 68, etc. exert forces on the rock between the kerfs, tending to fracture and dislodge such material. The breaker face 68 of cutter wheel 12 is rotated about the cutterhead axis c and serves to fracture and dislodge the rock material at the axis region.

From the foregoing, various further modifications, component arrangements and modes of utilization of the rock cutting equipment of this invention will be apparent to those skilled in the art to which the invention is addressed within the scope of the following claims.

What is claimed is:

1. In a rock boring machine including a cutterhead mounted for rotation about an axis, center cutter means comprising a disc cutter wheel having a circumferential cutting edge flanked by a pair of sloping rock breaker surfaces intersecting at the cutting edge, and means mounting said disc cutter wheel on said cutterhead with its cutting edge spaced radially close to said axis and oriented to cut a kerf concentrically surrounding said axis, with the radially inner rock breaker surface of such wheel being located close enough to said axis to effectively fracture all of the rock located radially inwardly of said kerf, said means comprising an elongated fixed shaft extending across the cutterhead and intersecting the axis of rotation of the cutterhead, and shaft support means on each side of said center cutter wheel.

2. The combination of claim 1, further comprising a plurality of additional disc cutter wheels mounted on the cutterhead and oriented to cut concentric kerfs surrounding the kerf cut by the inner cutter wheel, and each including a pair of sloping rock breaker surfaces flanking its cutting edge, said surfaces serving to fracture the rock between kerfs.

3. The combination of claim 1, wherein said shaft supports at least one additional disc cutter wheel which is independently mounted for free rotation about such shaft.

4. The combination of claim 3, wherein each said disc cutter wheel comprises a pair of parallel radial side faces, such cutter wheels are mounted for independent free rotation about the shaft by an annular sleeve type bearing, and an annular radial thrust seal contacts the radial inner portion of each cutter wheel side face, and a seal member concentrically surrounds each said thrust washer, each seal member having a radial seal face in sliding sealing contact with the side face of the cutter wheel.

5. The combination of claim 4, wherein each seal member is provided with an annular ring of elastomeric material between it and a portion of the mounting means, for cushioning the seal ring and axially urging it into contact with the side face of the cutter wheel.

6. In a rock boring machine including a cutterhead mounted for rotation about an axis, a center cutter assembly comprising:

a fixed shaft extending across the axis of rotation of the cutterhead, a first disc cutter wheel mounted for free rotation about said shaft at a location radially outwardly from said axis of rotation, a second disc cutter wheel mounted for free rotation about said shaft at a location spaced on the opposite side of said axis of rotation and radially outwardly from said axis a further distance than said first disc cutter wheel, each of said disc cutter wheels comprising a circumferential cutting edge oriented to cut a kerf along a circular path surrounding the axis of rotation, and sloping rock breaker surfaces flanking said cutting edge, with the radially inward breaker surface of the first disc cutter wheel being spaced close enough to the axis of rotation to effectively fracture the center region rock located inside the kerf established by such disc cutter wheel, and shaft support means on each side of each said disc cutter wheel.

7. The combination of claim 6, further comprising a third disc cutter wheel mounted for free rotation on said shaft radially outwardly of said first disc cutter wheel, said third disc cutter wheel being spaced radially outwardly from the axis of rotation a distance fruther than the second disc cutter wheel, and means supporting said shaft on each side of said third disc cutter wheel.

8. The combination of claim 7, further including a fourth disc cutter wheel and mounting means therefor situated laterally outwardly from an intermediate portion of said center cutter assembly, including a fixed shaft extending radially of the cutterhead and substantially at a right angle to the shaft of said center cutter assembly, said fourth disc cutter wheel being mounted for free rotation about said second shaft to form a kerf radially outwardly adjacent the kerf cut by the third disc cutter wheel.

9. The combination of claim 8, further comprising a fifth disc cutter wheel spaced laterally outwardly from said center cutter assembly on the side thereof opposite the fourth disc cutter wheel, and including a fixed shaft mounted on said cutterhead to extend radially of the cutterhead and substantially at a right angle to the axis of the center cutter assembly shaft and substantially co-axially with the shaft for the fourth disc cutter wheel, said fifth disc cutter wheel bieng mounted for free rotation about its shaft so as to cut a kerf radially outwardly adjacent the kerf cut by the fourth disc cutter wheel.

10. A rock cutting assembly comprising a fixed shaft, a disc cutting wheel mounted for free rotation on said shaft, said wheel including a pair of generally radial side faces, a circumferential cutting edge, and a pair of rock breaker surfaces flanking said cutting edge and intersecting the radial side faces of said wheel, mounting means for said shaft including a member disposed axially outwardly of each said radial side face, each said member including an annular groove therein opening towards its side face of the disc cutter wheel, a nonrotating seal member inside each said groove, and an elastomeric material serving to urge each seal member axially towards its radial face of the disc cutter wheel, said seal member including a radial seal face making sliding sealing contact with the radial face of the disc cutter wheel.

11. The rock cutter assembly of claim 10, comprising a sleeve type plain bearing mounting said disc cutter wheel for free rotation about the shaft, and an annular radial thrust bearing supported axially outwardly of each radial side face of the disc cutter wheel, radially inwardly of the seal members.

* * * * *